United States Patent
Klammer

(10) Patent No.: US 7,626,942 B2
(45) Date of Patent: Dec. 1, 2009

(54) METHOD OF CONDUCTING AN AUDIO COMMUNICATIONS SESSION USING INCORRECT TIMESTAMPS

(75) Inventor: Peter F. Klammer, Wheat Ridge, CO (US)

(73) Assignee: Spectra Link Corp., Boulder, CO (US)

( * ) Notice: Subject to any disclaimer, the term of this patent is extended or adjusted under 35 U.S.C. 154(b) by 416 days.

(21) Appl. No.: 11/603,848

(22) Filed: Nov. 22, 2006

(65) Prior Publication Data

US 2008/0117901 A1    May 22, 2008

(51) Int. Cl.
*H04J 1/16*  (2006.01)
*H04L 12/56*  (2006.01)

(52) U.S. Cl. .................. 370/252; 370/487; 370/503

(58) Field of Classification Search .............. 370/389, 370/252, 487, 503
See application file for complete search history.

(56) References Cited

U.S. PATENT DOCUMENTS

| | | | | |
|---|---|---|---|---|
| 5,640,388 A | * | 6/1997 | Woodhead et al. .......... | 370/468 |
| 5,805,602 A | * | 9/1998 | Cloutier et al. ............ | 370/516 |
| 6,687,752 B1 | * | 2/2004 | Falco et al. ................ | 709/230 |
| 6,996,626 B1 | * | 2/2006 | Smith ........................ | 709/232 |
| 7,173,945 B1 | * | 2/2007 | Liu et al. ................... | 370/516 |
| 7,336,678 B2 | * | 2/2008 | Vinnakota et al. .......... | 370/429 |
| 7,379,466 B2 | * | 5/2008 | Kavaler ..................... | 370/412 |
| 7,499,472 B2 | * | 3/2009 | Spitzer ...................... | 370/505 |
| 2003/0053546 A1 | * | 3/2003 | Gandhi et al. ......... | 375/240.27 |
| 2004/0153716 A1 | * | 8/2004 | Baker ........................... | 714/4 |
| 2006/0149850 A1 | * | 7/2006 | Bowman .................... | 709/231 |

* cited by examiner

*Primary Examiner*—John Pezzlo
(74) *Attorney, Agent, or Firm*—Wong Cabello

(57) ABSTRACT

A local area network includes a number of IP capable phones which send and receive packets of audio or other information to each other over the network. Some of the phones can be wired to the network and some of the phones can be wirelessly connected to the network. The network also includes one or more access points that serve as the interface between the network and the wireless phones and the network can include some sort of switching device, such as a router. In the event that one of the phones sends a packet of audio information to another phone and the packet is marked with an incorrect timestamp value, the phone receiving the incorrectly timestamped packet is able to correct the timestamp value so that the phone can process the packet of audio information.

17 Claims, 6 Drawing Sheets

METHOD OF CONDUCTING AN AUDIO COMMUNICATIONS SESSION USING INCORRECT TIMESTAMPS

FIELD OF THE INVENTION

This invention relates generally to the field of wired and wireless communication in a LAN environment and specifically to conducting an audio communication session between IP capable communication devices in which frames of incorrectly timestamped information are used.

BACKGROUND

Internet Protocol capable audio communication devices, whether they are wired or wireless, that format packets of audio information according to the RTP protocol for transmission to another audio communications device include, among other things, in the header field of each packet a timestamp value that represents a time reference when the packet is created. This time reference can be, for instance, based on the number of audio samples that have been generated during a communication session to that point. So, for instance, if the first packet of audio information transmitted during a communications session has a timestamp value of "Zero" and if there were eighty samples of audio information in each packet, the next packet transmitted would have a time stamp value of eighty, and so forth. Alternatively, the timestamp value could represent a synchronized network clock value at the point in time that the first sample in each frame was generated. Regardless of the strategy used to create the timestamp, this value is used by an audio communications device that receives the packet to determine the current mean transmission delay time, the level of jitter that is being experienced, the order in which each packet is selected for processing and the time at which the packet should be "played" by the communications device. Under certain circumstances, a communications device that is generating packets of audio information may mark one or more of the packets with incorrect timestamp values. This can happen for a variety of reasons. For instance, if a communications device marks a packet with a timestamp value at the time the packet is transmitted as opposed to the time the packet was generated, normal variations in transmission delay would result in incorrect timestamp values.

As a consequence of the above, if the communications device is configured to process a packet containing two hundred forty samples of audio information and receives packets with timestamp values are not valid, the devices may try to play the packet at the wrong time or ignore the packet entirely. This has the effect of creating periods of silence or the loss of voice information during a communication session. So, for instance, if a current packet has a timestamp value of "4528" and a subsequent packet has a timestamp value of "4757", it is likely that the communications device would drop the first eleven samples of the subsequent packet therefore losing the audio information contained in those eleven samples. On the other hand, if the communications device detects a timestamp value of "4510" in a current packet and a value of "4757" in a subsequent packet, there would be missing information between packets equivalent to the time it takes to play seven samples. This gap may be perceived by the user as sharp clicking sounds, stuttering or periods of silence. Generally speaking, the behavior of a communications device to packets it perceives as arriving early or late has a damaging effect on the overall quality of a communications session.

So, it would be advantageous if a communications device was capable of processing incorrectly timestamped packets of audio information as if the packets were correctly timestamped. Further, the quality of a communications session would be improved if entire or portions of incorrectly timestamped packets were not discarded by the receiving communications device. I have solved this problem by inventing a method that enables a wired or wireless communications device to maintain a high quality communications session in the presence of incorrectly timestamped packets of audio information by modifying the timestamps of incoming packets, if they deviate by no more than a specified amount, so that the timestamp value coincides with a calculated, known good timestamp value.

SUMMARY OF THE INVENTION

In one embodiment of my invention, a LAN includes some number of communications devices and some number of intermediate communications devices where the communications devices operate to detect a timestamp value associated with a first or current audio packet; use the timestamp value to calculate and store a timestamp value expected for the next audio packet; detect a timestamp value associated with the next audio packet and compare the stored value with the most recently received value and if the two values are different modifying the value of associated with the most recently received audio packet to be the calculated and stored value.

In another embodiment of my invention, a LAN includes some number of wireless communication devices and some number of intermediate communications devices where the communications devices operate to conduct a communications session in the presence of incorrectly timestamped audio packet values by detecting a timestamp value of a current audio packet; using this audio packet to calculate a timestamp value for a next audio packet and store the value; detecting and storing a timestamp value associated with a next audio packet and comparing the timestamp value associated with this audio packet with the previously calculated and stored timestamp value; and modifying the timestamp value in the most recently receive audio packet if the values of the calculated and stored timestamp value and the most recently received audio packet timestamp value are different by more than a specified tolerance value.

BRIEF DESCRIPTION OF THE DRAWINGS

FIG. 6b is a continuation of the logical flow diagram in FIG. 6a.

DETAILED DESCRIPTION OF THE INVENTION

Figure 1:
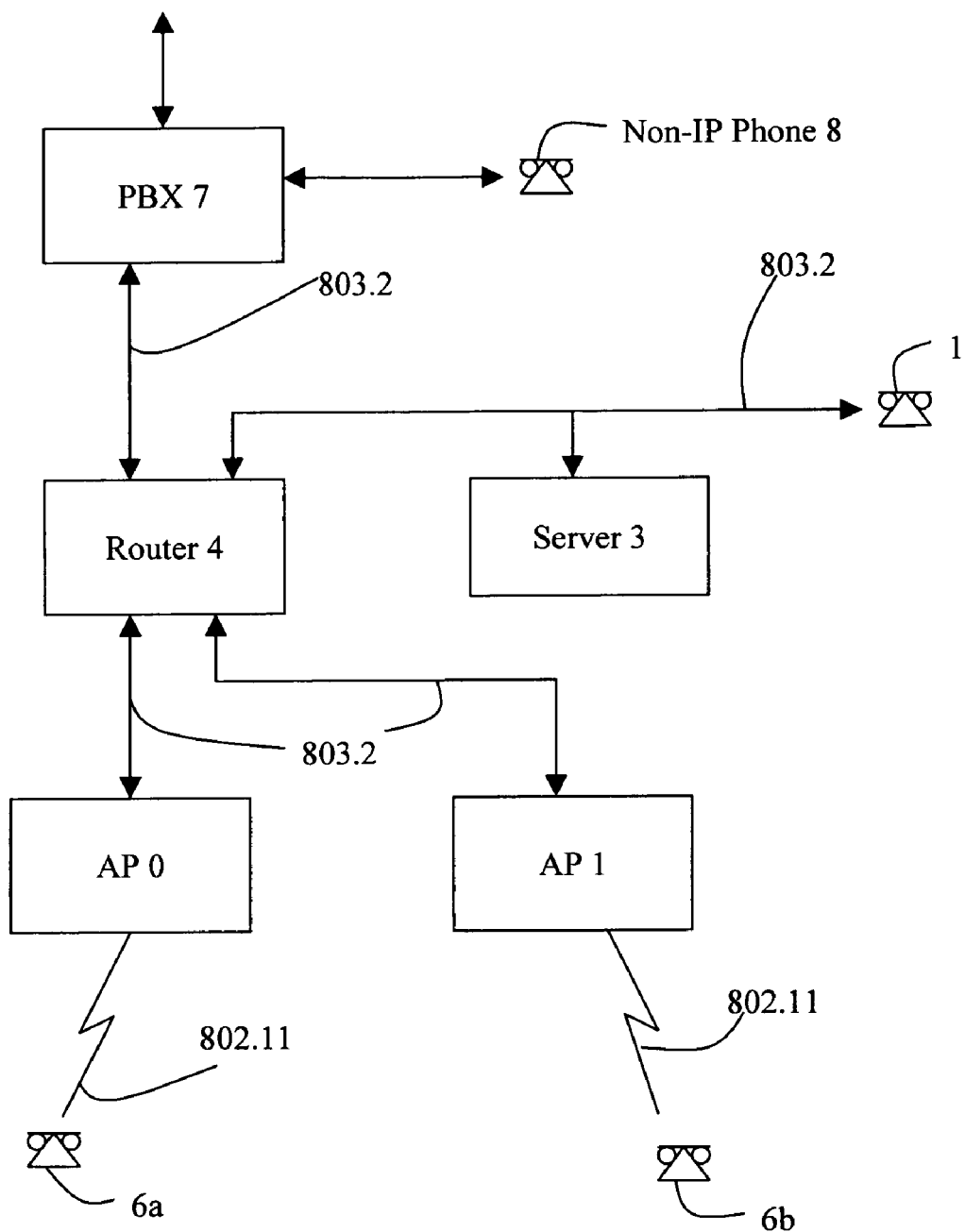
FIG. 1 is a high level block diagram of a LAN with both wireless and wired phones capable of generating packets of audio information in the IP format.

An exemplary environment in which my invention operates is illustrated by the LAN 10 of FIG. 1. This LAN encompasses both wired and wireless portions. Wired communications devices, such as IP phone 1, generally operate to capture digital samples of an analog audio waveform at a particular sampling rate, possibly compress and encrypt this digital sample, and then place this audio information into packets in the well known RTP format for transmission over the LAN. As part of this process, the IP phone typically creates a timestamp that it places in a particular field of an RTP header associated with an audio packet which can represent a time reference when the packet was created or transmitted. Generally speaking, all packets transmitted over the wired portion of the LAN are formatted and observe a protocol that is defined in the IEEE 803.2 specification otherwise known as Ethernet. A server 3, generally operates to track the communications devices logged into it and to receive audio packets from the wired phone 1, a PBX 7 and a router 4 and to transmit the packets to the destinations indicated by a destination address in the packet header. In the case of IP phones this destination address is an IP address. Router 4 generally operates to receive packets from the server 3, the PBX 7 and from the access points (AP) 5a and 5b and to forward the packets to a destination specified by an IP address associated with the packet. The access points 5a and 5b both operate to receive packets of audio information over the wireless medium from the wireless communications devices 6a and 6b respectively and to forward these packets over the wired portion of the LAN 10 to the destinations indicated by an IP address contained in the packet. I will not offer a detailed description of the operation of the server 3, the router 4 or of the access points 5a and 5b as commercial devices such as these are readily available and their operation is well understood by those skilled in the art of LAN communications.

As described above, IP phone 1 can generate and transmit timestamped packets of audio information. These packets can be transmitted to either or both of the wireless phones 6a and 6b. Upon receipt of a packet, the wireless phone will, among other things, examine the timestamp value contained in the audio packet and determine if it is a valid timestamp value. If the timestamp value is valid, the packet is processed in a normal fashion; however, if the timestamp value is not valid, a portion or the entire packet could be discarded or not "played" resulting in unexpected and unacceptable noise or periods of silence during a communication session. I will describe in detail how a wireless phone determines the validity of a packet later with reference to FIGS. 5a and 5b. And finally, the PBX 7 generally operates as a switch to receive audio packets from both the server 3 and the router 4 and to forward them to a wide area network (WAN) 8 for instance.

Figure 2:
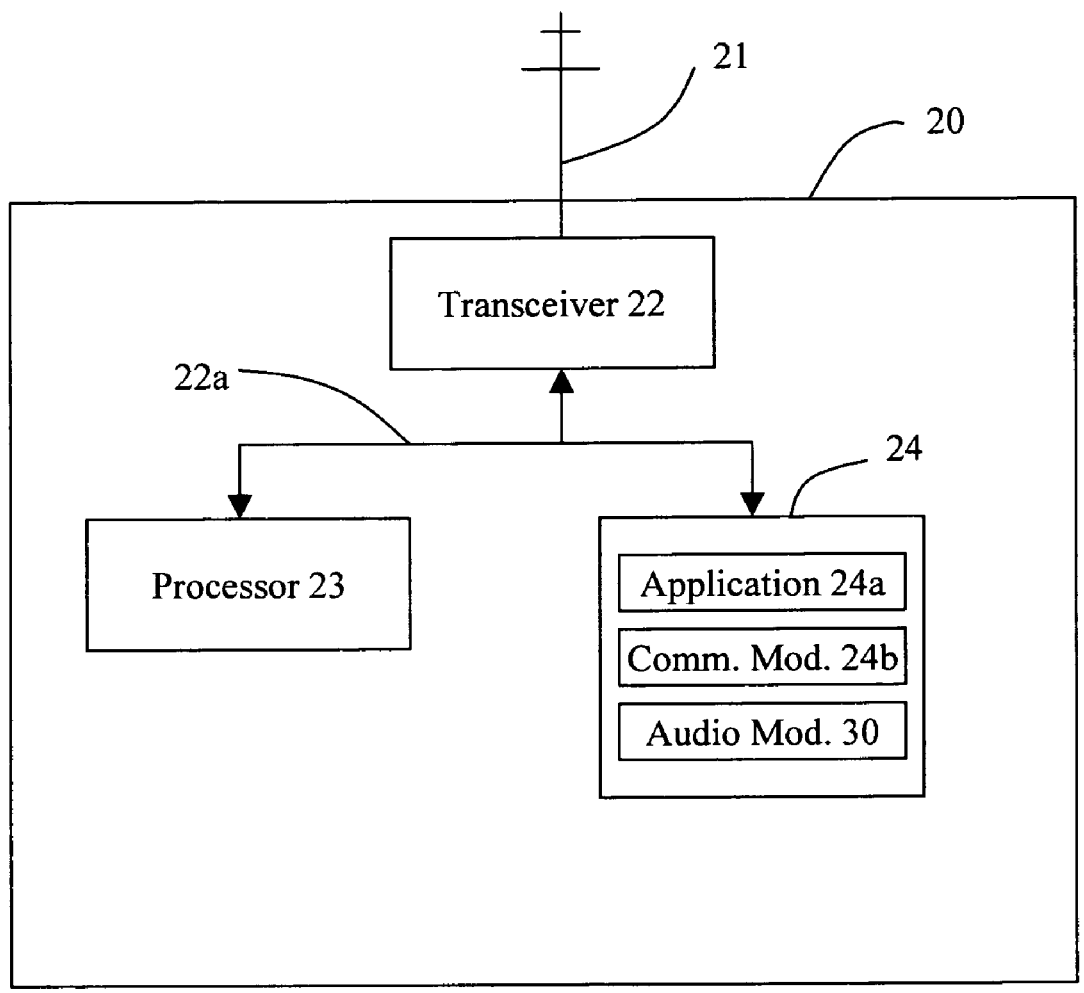
FIG. 2 is a functional block diagram of a wireless communications device capable of receiving audio packets in the IP format.

I will now proceed, with reference to FIG. 2, to describe a wireless IP capable phone 20 that can be employed to implement the method of my invention. The wireless phone includes an antenna 21 that serves as the phone's interface with the wireless medium and operates to propagate wireless signals and is the initial reception point for incoming wireless signals. The antenna is connected to a transceiver 22, which operates to demodulate the wireless signals containing packets of voice/audio information received from the antenna and the transceiver operates to modulate signals prior to their being sent to the antenna. The transceiver is connected over a bus 22a to a processor 23 and memory 24. Although not shown, the phone 20 also includes an input/output user interface element like a microphone and speaker, a display element of some sort and a keyboard element. Although these elements are essential to the operation of the phone, they are not essential to the operation of my invention and so will not be described in any detail.

Continuing to refer to FIG. 2, processor 23 generally functions in conjunction with a telephony application 24a stored in memory 24 to perform certain functions necessary for the operation of the phone. The telephone application generally controls such functionality as initiating, maintaining, and ending communications sessions. The telephone application does not have a direct effect on my invention and so will not be described here in detail, never-the-less, similar applications are used on other wireless communications devices and their design and functionality is well understood by wireless communications engineers. Communications module 24b also stored in memory 24 includes medium access control (MAC) functionality and mid-stack functionality. The MAC functionality is well known and generally manages the physical link to the wireless LAN which includes, among other things, 802.11 packetization. The mid-stack generally refers to IP protocol stack communications functionality above the MAC layer which starts at the LLC layer and includes network and transport layer functionality. Both the MAC and mid-stack functionality are well known and have no special effect on the operation of my invention and so will not be discussed here in any detail.

Continuing to refer to FIG. 2, an audio module 30 generally operates to digitize an analog audio signal it receives from a user interface such as a microphone, compress and possibly encrypt the digitized audio information and place the digitized audio information into an RTP packet format. As part of this packetization process, a timestamp value indicative of the relative network time of creation of the packet is placed in an RTP header associated with the packet. This RTP packet is then transmitted to the mid-stack. In the other direction, the audio module receives RTP packets from the mid-stack that that the wireless phone receives from some other communications device on the network, which can be wired phone 1a of FIG. 1 for instance. The RTP packets are temporarily buffered in memory 24 where the header is examined for, among other things, a time stamp value which is indicative of the relative time of the packets creation at wired phone 1a. The packet is decrypted, de-compressed and transformed from a digital signal to an analog signal to be played out over another user interface such as a speaker for instance.

Figure 3:
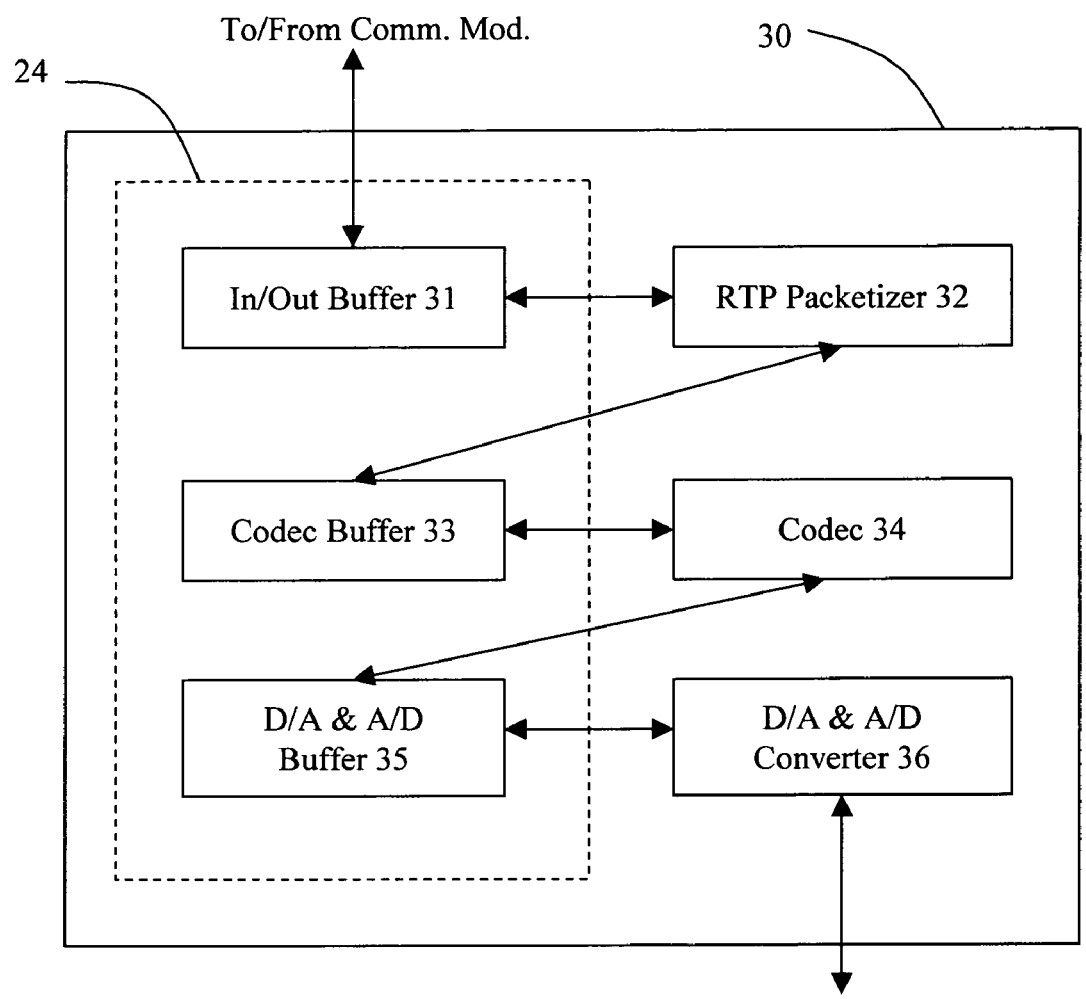
FIG. 3 is a functional block diagram of the audio module associated with the wireless communications device of FIG. 2.

Referring now to FIG. 3 I will describe the sub-modules composing the audio module 30 functionality. Although FIG. 3 illustrates the audio module as operating in two directions; namely, it operates in a first direction to receive and process for playing packets of audio information from the communications module 24b and it operates in a second direction to receive audio samples from a microphone that are placed into a frame and then packetized for transmission to the communications module, I will only describe the operation of the audio module from the perspective of its operation in the first direction, as this direction is relevant to the operation of my invention. Buffer 31 operates to temporarily store RTP packets the audio module receives from the mid-stack. The RTP packetization sub-module 32 operates on the RTP packets stored in buffer 31 to, among other things, examine a time stamp value associated with the packet and to strip the header information from the frame of audio information The RTP packet field format will be described later in detail with reference to FIG. 4. The RTP packetization sub-module 32 then passes the frame of audio information to a buffer 33, which operates to temporarily store the frame for processing by the codec 34 which decodes the frames of audio information. In this case, a frame of audio information may be composed of two hundred forty 0.125 usec samples of audio information, which makes each frame 30 milliseconds in length. Each frame of audio information is encoded or decoded according to any of the number of well known audio codec's as described in the ITU-T standard specifications for G711 or G729 for instance. Digital-to-analog and analog-to-digital converter buffer 35 receives the decoded frame and operates to temporarily store a digital representation of the audio information. This frame of audio information is operated on by a D/A converter 36 which transforms the audio into analog audio information respectively which is then played by the communications device such as a speaker for instance. Although I have described three separate buffers, 31, 33 and 35 above, it should be understood that these buffers can be thought of as three logically separate temporary storage locations or three address ranges within memory 24.

Continuing to refer to FIG. 3, generally, the audio module 30 operates to receive RTP packets of audio information from the communication module and temporarily store them in buffer 31. The RTP packetizer operates on the packets stored in buffer 31 to examine, among other things, the timestamp value in the header and to strip the header information from the audio information. This results in a frame of coded audio information which is temporarily stored in codec buffer 33. The codec 34 operates on the frame of audio information to de-compress the audio into information that can be operated on by the D/A converter 36. As the result of the de-compression process, a frame of digitized audio information is stored in D/A-A/D buffer 35 where it is made available to the D/A converter to be transformed into analog audio information which is a format that is utilized by the user interface. More specifically, and with respect to the novel aspects of this design, at the beginning of a communication session between wired phone 1 and wireless phone 6a of FIG. 1, the wireless phone MAC functionality receives an initial or current IP packet of audio information and at the mid-stack module this packet is converted from a packet in the IP format to an RTP packet by stripping off the IP header and any UDP header if present. Eventually, the audio module 30 receives the RTP packet and examines the header for the timestamp value associated with the packet. This timestamp value is stored and an audio module routine, "Calculate Expected Timestamp" then operates on this stored timestamp value to calculate and store an expected timestamp value of the next expected packet. The initial packet is then processed in the normal fashion by the codec and the D/A converter for ultimate use by a user interface. The header in the next or subsequent RTP packet received by the phone is examined by the audio module or the RTP packetizer sub-module of the audio module for the timestamp value associated with the RTP packet. This timestamp value is detected and stored in memory 24. The stored current packet timestamp value is compared to the stored next expected packet timestamp value and if the timestamp values are the same, the packet is processed in the normal fashion. However, and according to my invention, if the compared timestamp values differ by one-quarter or less of the total number of the audio samples contained in the packet, then the audio module modifies the current packet timestamp value to be the same as the next expected packet time stamp value and then processes this next packet in the normal fashion. In either case, whether the current timestamp has been modified or not, the audio module routine, "Calculate Expected Timestamp", then operates on the current packet timestamp value to calculate the next expected timestamp value associated with the next RTP packet and so forth. The operation of the audio module 30 will be described further below with reference to FIGS. 4, 5a, 5b and 5c.

Figure 4:
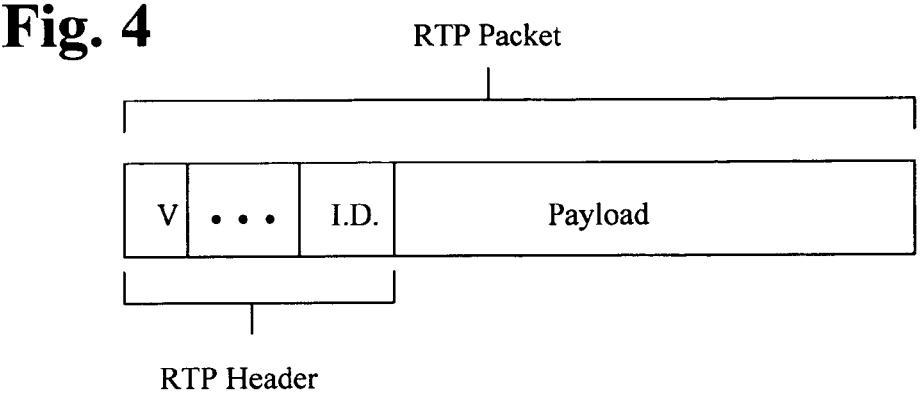
FIG. 4 illustrates the format of an audio RTP packet.

FIG. 4 is a diagram showing the RTP packet format with an RTP packet header of twelve octets and payload of some number of bits depending upon the number of samples in the frame of audio information. The diagram shows a timestamp value occupying octets five, six, seven and eight in the header. As mentioned previously, this timestamp value indicates the time reference when the packet was created and is used by a receiving phone, wireless phone 6a for instance, to determine the relative time ordering of audio reproduced or played from the packet.

Instead of playing silence when one or more frames of voice information are missing, it is common to substitute an approximation of the missing audio information into the voice signal stream or to fade over time to silence. Methods for utilizing previous frames of voice information to approximate lost voice information are well know and so will not be described here in any detail. However, I have discovered that by correcting packet timestamp values that are in error by one-quarter or less of the number of samples in a frame of voice information, these frames are not lost to the communications session. In other words, by correcting slightly incorrect timestamp values, a communications device, such as a wireless phone, is able to detect at least all of the frames with timestamp errors not exceeding one-quarter of the number of samples in a frame of voice information. My timestamp correction method improves the perceived quality of a voice communications session for the user. Furthermore, my invention works very well with the method for approximating missing frames mentioned above. For all frames that exceed the timestamp error threshold of one-quarter the number of samples in a frame, the communication device can be configured such that the approximation method starts operating at the point that the timestamp correction method stops working, namely at the one-quarter threshold. Also, the method of my invention is not limited to frames containing two hundred forty samples of voice information but can be employed with frames with more or fewer samples.

Figure 5A:
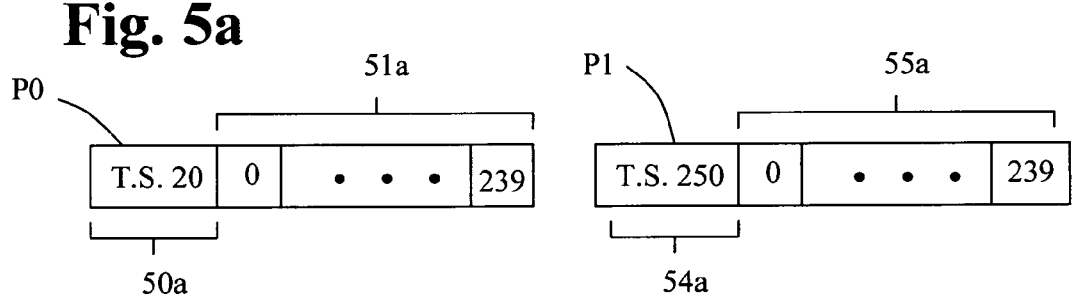
FIG. 5a illustrates two sequential audio packets with the second packet arriving early.

Turning now to FIG. 5a, which is a diagram showing two sequential RTP packets of voice information, a current packet P0 and a next packet P1 respectively, with packet P1 shown as marked with an early timestamp. In this case, the wireless phone would either not recognize the beginning of packet P1 and therefore ignore this packet of voice information which creates dead time in the voice stream, or it would discard ten samples which could result in some other degrading artifact. More specifically, current packet P0 includes a header 50a with a timestamp value of 20 and a payload 51a including two hundred forty samples of digitized voice information which is represented by a first sample labeled "0" and a last sample labeled "239". The next received packet P1 includes a header 54a with a timestamp value of "250" and a payload 55a including two hundred forty samples of digitized voice information. As described previously with reference to FIG. 3, a communications device, phone 6a for instance, is inspecting the timestamps of every received RTP packet to reassemble an unbroken sequence of samples for audio reproduction. In this case, the audio module examines the header of the current packet P0 and detects the timestamp value to be "20" and that the number of audio samples is two hundred forty. This packet provides samples for time slots "20" through "259", and the next available unfilled sample time slot is number "260". In this case, the timestamp value of the next received packet, P1, is "250". As the phone has time slots "250" through "259" already supplied, the phone detects this as an error and could discard the packet of audio information resulting in a period of dead time or silence. However, according to the method of my invention, it is possible to correct the timestamp value in packet P1 so that the user does not experience any dead time and the quality of the communications session is maintained. I will describe how this timestamp correction is made in detail later with reference to FIG. 6.

Figure 5B:
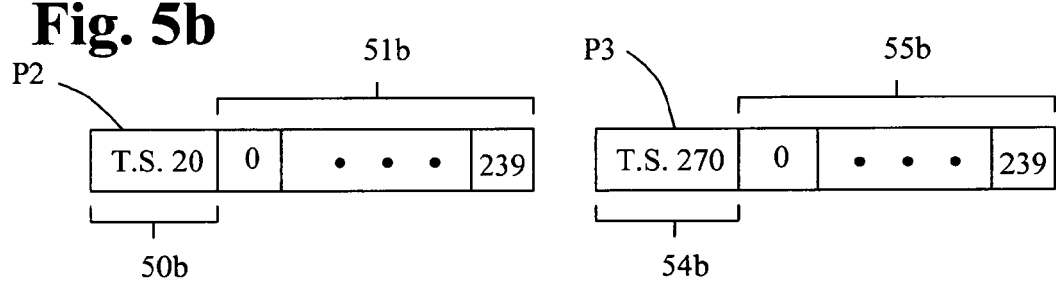
FIG. 5b illustrates two sequential audio packets with the second packet arriving late.

Referring now to FIG. 5b, which is a diagram showing two sequential RTP packets of voice information, P2 and P3 respectively, with packet P3 shown as marked with a late timestamp. In this case, the wireless phone would play the frame of audio information late which creates dead time in the voice stream. More specifically, the current packet P2 includes a header 50b with a timestamp value of "20" and a payload 51b including two hundred forty samples of digitized voice information which is represented by a first sample labeled "0" and a last sample labeled "239". As in figure 5a above, this packet supplies samples for time slots "20" through "259". The next received packet P3 includes a header 54b with a timestamp value of "270" and a payload 55b including two hundred forty samples of digitized voice information. Since the RTP packets supplied no sample data for time slots "260" through "269", these samples may be left zeros or indeterminate values. According to the above scenario, the audio module will typically play the packet late causing dead time as described earlier. However, according to the method of my invention, it is possible to correct the timestamp value in packet P1 so that the user does not experience any dead time and the quality of the communications session is maintained.

Figure 5C:
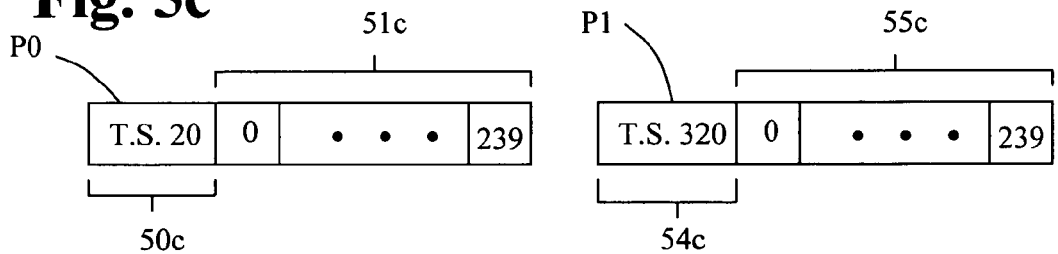
FIG. 5c illustrates two sequential audio packets with the second packet containing a timestamp value outside the margin of correctible error.

Referring now to FIG. 5c, which shows two packets, P0 and P1, where the timestamp error is outside the tolerance of the method of my invention, i.e., the difference between the expected timestamp value and the received timestamp value is more than one-quarter of the number of samples in a packet of audio information. In this case, the communications device perceives that packet P1 is marked sixty samples late and since the method of my invention only operates to correct timestamps with values that do not deviate by the one-quarter sample threshold rule, the frame would be dropped and the user would perceive this as a gap in the voice stream. In an alternative embodiment of my invention, when the timestamp values between an expected value and a received value differ by greater than the one-quarter sample threshold rule, the audio module 30 of FIG. 3 calls a routine, "approximate sample", which proceeds to calculate an approximation of what the voice stream could have been and replaces what would otherwise be dead time with some number of samples of an approximated voice signal I will now describe the operation of my invention with reference to FIGS. 6a and 6b. Also, I will assume for the purpose of this description that a communications session has been initiated between two communications devices, wired phone 1a and wireless phone 6a for instance, and that the first packet that wireless phone 6a receives during this session can be the same as the current packet which can be any packet received during the session including the first packet that phone 6a receives during the session. Now referring to FIG. 6a, in step 1 the audio module 30 receives a current RTP packet and temporarily stores it in buffer 31 of FIG. 3. In step 2, the RTP packetizer examines the header of the current packet for, among other things, the timestamp value and then stores the timestamp value in memory 24 of FIG. 2 and then processes the packet normally. In step 3, the audio module calls a routine, "calculate expected timestamp value" and this routine uses the stored current timestamp value to calculate the subsequent or next packets expected timestamp value. This calculation is made by simply adding the number of samples in a frame of voice information, which in this case is two hundred forty, to the current timestamp value, which can be twenty for instance, to arrive at the expected timestamp value for the next packet which would be two hundred sixty. This expected timestamp value is then stored in memory 24.

Figure 6A:
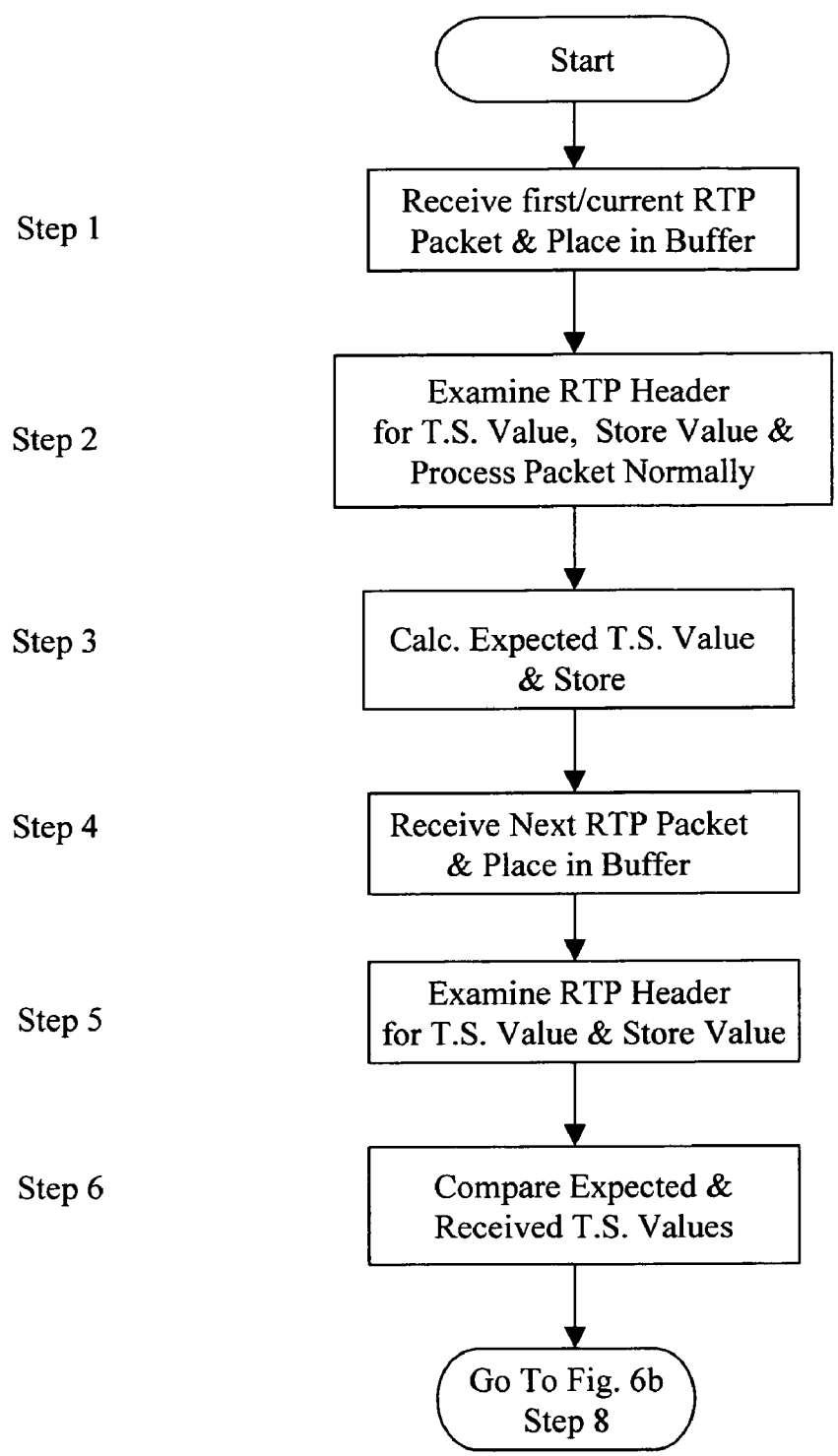
FIG. 6a is a logical flow diagram describing of the method of my invention.

In step 4 of FIG. 6a, the audio module 30 receives a next RTP packet of voice information and temporarily stores it in buffer 31. In step 5, the RTP packetizer examines the header of the next packet for, among other things, the timestamp value and then stores the detected timestamp value in memory 24. In step 6, the audio module calls a routine, "Compare Timestamp Values", which operates to compare the timestamp value for the next packet stored in step 5 and the expected timestamp value calculated and stored in step 3. Specifically, the expected timestamp value is subtracted from the next timestamp value and if, in step 8 of FIG. 6b, the resultant absolute value is equal to zero, the process proceeds to step 10, otherwise if the resultant absolute value of this comparison process is greater than zero the process proceeds to step 8 in FIG. 6b where the amount of the difference is quantified to be greater than or less than or equal to the one quarter sample threshold. If the result of this quantification indicates that the timestamp error is greater than the one quarter sample threshold, the process proceeds to step 10, otherwise the process proceeds to step 9 where the audio module calls a routine, "correct timestamp", that operates on the next packets timestamp value stored in step 5 to change it to be the same as the expected timestamp value stored in step 3 and the process then proceeds to step 10 where the frame is processed in the normal manner. Normal frame processing in this case is the processing associated with the codec 34 and the D/A converter 36 as described with reference to FIG. 3. Proceeding to step 11, the process uses the corrected T.S. value of step 9 to calculate the expected T.S. value of the next frame in the same way as in step 3. This value is then stored.

Figure 6B:
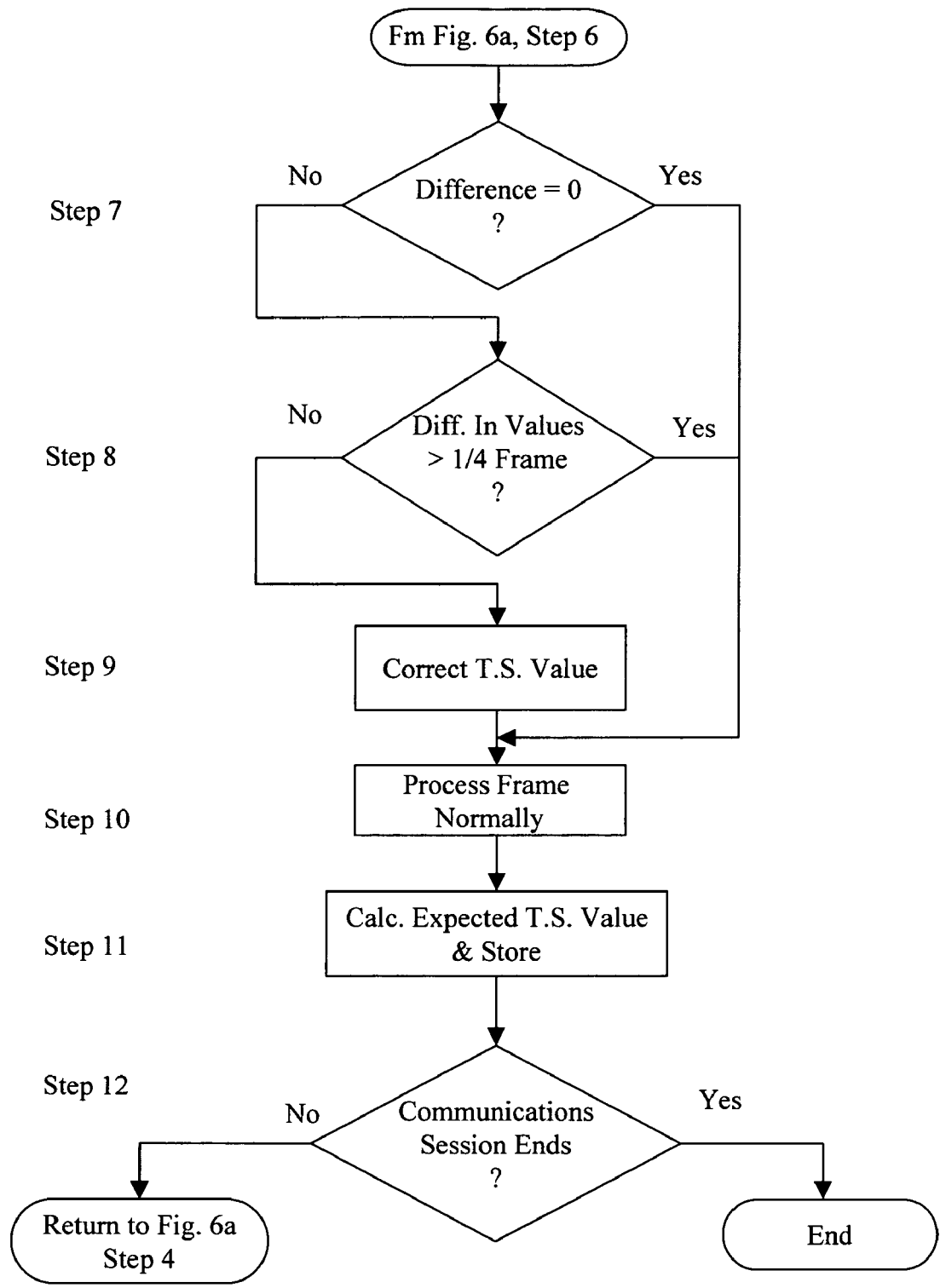

Continuing to refer to FIG. 6b, in step 12 if the communications session is terminated the process ends, otherwise the process returns to step 4 in FIG. 6a and continues until the session is terminated by either wireless phone 6a or wired phone 1a.

It should be understood that the method of my invention is not limit to operating in a hybrid network or a network that support both wired and wireless communications devices. Rather, my invention works equally well if the network only supports wired devices or only supports wireless devices.

I claim:

1. In a local area network including a plurality of communications devices and a plurality of intermediate communications devices, a method for conducting a communications session using incorrectly timestamped packets of audio information comprised of one of the plurality of communications devices performing the steps of:

detecting a timestamp value associated with a current received packet of audio information:

using the timestamp value associated with the current received packet of audio information to compute a timestamp value for a next packet of audio information and storing the timestamp value:

detecting and storing a timestamp value associated with the next received packet of audio information:

comparing the stored, computed timestamp value and the stored timestamp value associated with the next received packet of audio information to be different:

modifying the stored timestamp value associated with the next received packet of audio information to be the same as the stored, calculated timestamp value computed from the current received packet of audio information: and processing the next received packet of audio information.

2. The method of claim 1 wherein the steps of detecting a time stamp value associated with a current received packet of audio information: using the current received packet timestamp value to compute a timestamp value for a next packet of audio information and storing the timestamp value: detecting and storing a timestamp value associated with the next received packet of audio information: comparing the stored, computed timestamp value and the stored timestamp value associated with the next received packet of audio information to be different: modifying the stored timestamp value associated with the next received packet of audio information to be the same as the stored, calculated timestamp value computed from the current received packet of audio information: and processing the next received packet of audio information are performed repeatedly.

3. The method of claim 1 wherein the communications devices are comprised of one or more of a plurality of wireless communications devices and wired communications devices.

4. The method of claim 1 wherein the communications devices are comprised of IP capable devices.

5. The method of claim 1 wherein the intermediate communications devices are comprised of one or more or a server, a router and an access point.

6. The method of claim 1 wherein the intermediate communications devices are comprised of IP capable devices.

7. The method of claim 1 wherein the step of modifying the stored, computed timestamp value associated with the next received packet of audio information is performed if the difference between the stored, computed timestamp value and the stored timestamp value associated with the next received packet of audio information is within a tolerance range.

8. In a local area network including a plurality of IP capable communications devices and a plurality of IP capable intermediate communications devices, a method for conducting a communications session using incorrectly timestamped packets of audio information comprising one of the plurality of IP capable communications devices repeatedly performing the steps of:

detecting a timestamp value associated with a current received packet of audio information:

using the current received packet timestamp value to compute a timestamp value for a next packet of audio information and storing the timestamp value:

detecting and storing a timestamp value associated with the next received packet of audio information:

comparing the stored, computed timestamp value and the stored timestamp value associated with the next received packet of audio information to be different:

modifying the stored timestamp value associated with the next received packet of audio information to be the same as the stored, calculated timestamp value computed from the current received packet of audio information: and processing the next received packet of audio information.

9. The method of claim 8 wherein the IP capable communications devices are one or more of a plurality of wireless communications devices and wired communications devices.

10. The method of claim 8 wherein the IP capable intermediate communications devices are one or more of a server, a router and an access point.

11. The method of claim 8 wherein the step of modifying the stored, computed timestamp value associated with the next received packet of audio information is performed if the difference between the stored, computed timestamp value and the stored timestamp value associated with the next received packet of audio information is within a tolerance range.

12. The method of claim 11 wherein the tolerance range is a range of values from one to one quarter of the number of audio samples in a packet of audio information.

13. In a local area network including a plurality of IP capable communications devices and a plurality of IP capable intermediate communications devices, a method for conducting a communications session using incorrectly timestamped packets of audio information comprised of one of the plurality of communications devices performing the steps of:

detecting a timestamp value associated with a current received packet of audio information:

using the timestamp value associated with the current received packet of audio information to compute a timestamp value for a next packet of audio information and storing the timestamp value:

detecting and storing a timestamp value associated with the next received packet of audio information:

comparing the stored, computed timestamp value and the stored timestamp value associated with the next received packet of audio information to be different;

modifying the stored timestamp value associated with the next received packet of audio information to be the same as the stored, calculated timestamp value computed from the current received packet of audio information if the difference between the computed timestamp value and the next timestamp value is no more than a tolerance value and substituting an approximation of missing audio information into the next received packet of audio information if the difference between the computed timestamp value and the next timestamp value is more than a tolerance value; and processing the next received packet of audio information.

14. The method of claim 13 wherein the steps of detecting a time stamp value associated with a current received packet of audio information: using the current received packet timestamp value to compute a timestamp value for a next packet of audio information and storing the timestamp value; detecting and storing a timestamp value associated with the next received packet of audio information: comparing the stored, computed timestamp value and the stored timestamp value associated with the next received packet of audio information to be different; modifying the stored timestamp value associated with the next received packet of audio information to be the same as the stored, calculated timestamp value computed from the current received packet of audio information if the difference between the computed timestamp value and the next timestamp value is no more than a tolerance value and substituting an approximation of missing audio information into the next received packet of audio information if the difference between the computed timestamp value and the next timestamp value is more than a tolerance value; and processing the next received packet of audio information are performed repeatedly.

15. The method of claim 13 wherein the IP capable communications devices are one or more of a plurality of IP capable wireless communications devices and IP capable wired communications devices.

16. The method of claim 13 wherein the IP capable intermediate communications devices are one or more or a server, a router and an access point.

17. The method of claim 13 wherein the tolerance range is a range of values from one to one quarter of the number of audio samples in a packet of audio information.

* * * * *